No Printed Specification Available
3760X
2 Sheets—Sheet 1.
LANGDON, LANGDON & TRASH.
Corn Mill.
Patented Sept. 26, 1823.
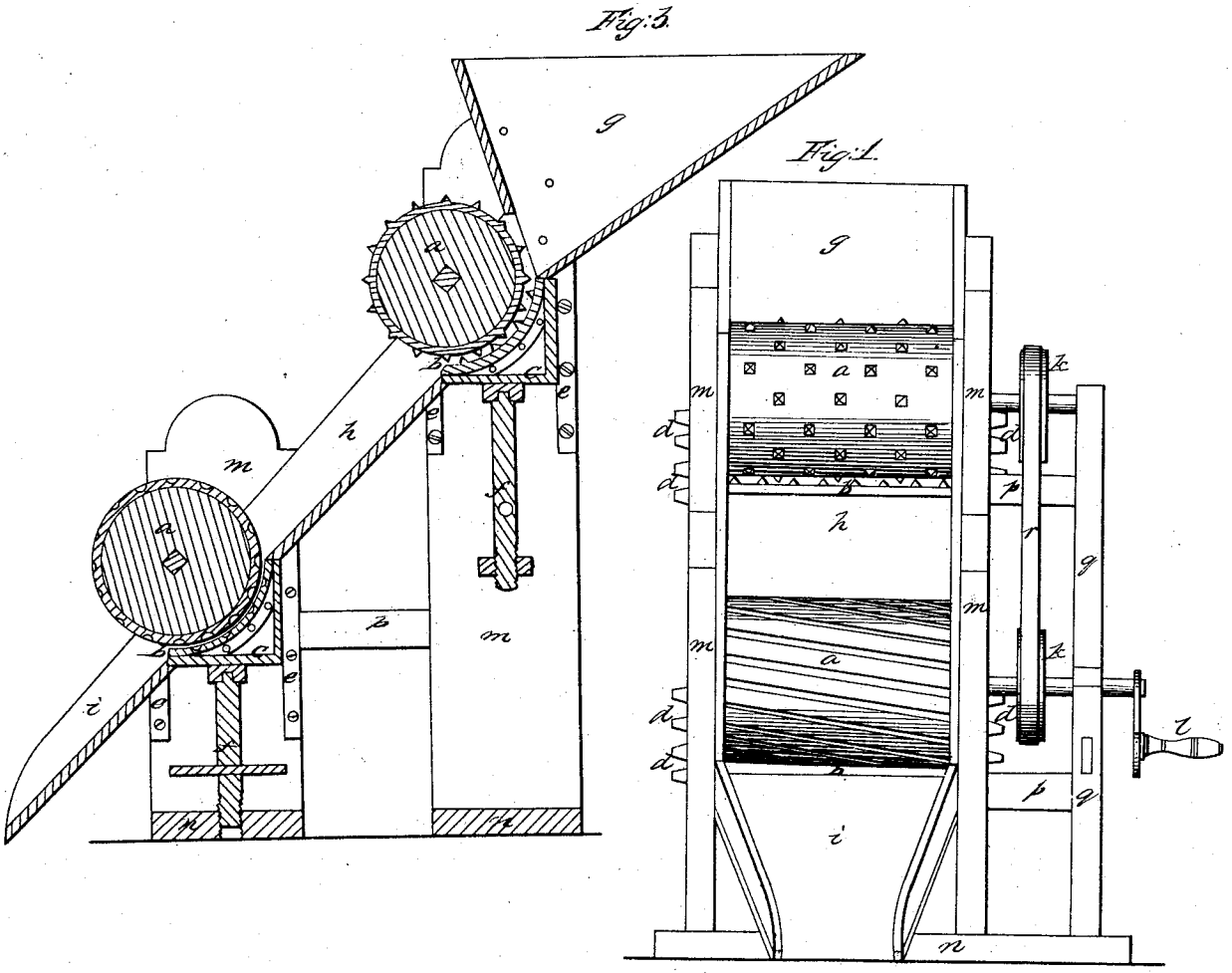
N. PETERS, Photo-Lithographer, Washington, D. C.

3760X
2 Sheets—Sheet 2.
LANGDON, LANGDON & TRASH.
Corn Mill.
Patented Sept. 26, 1823.
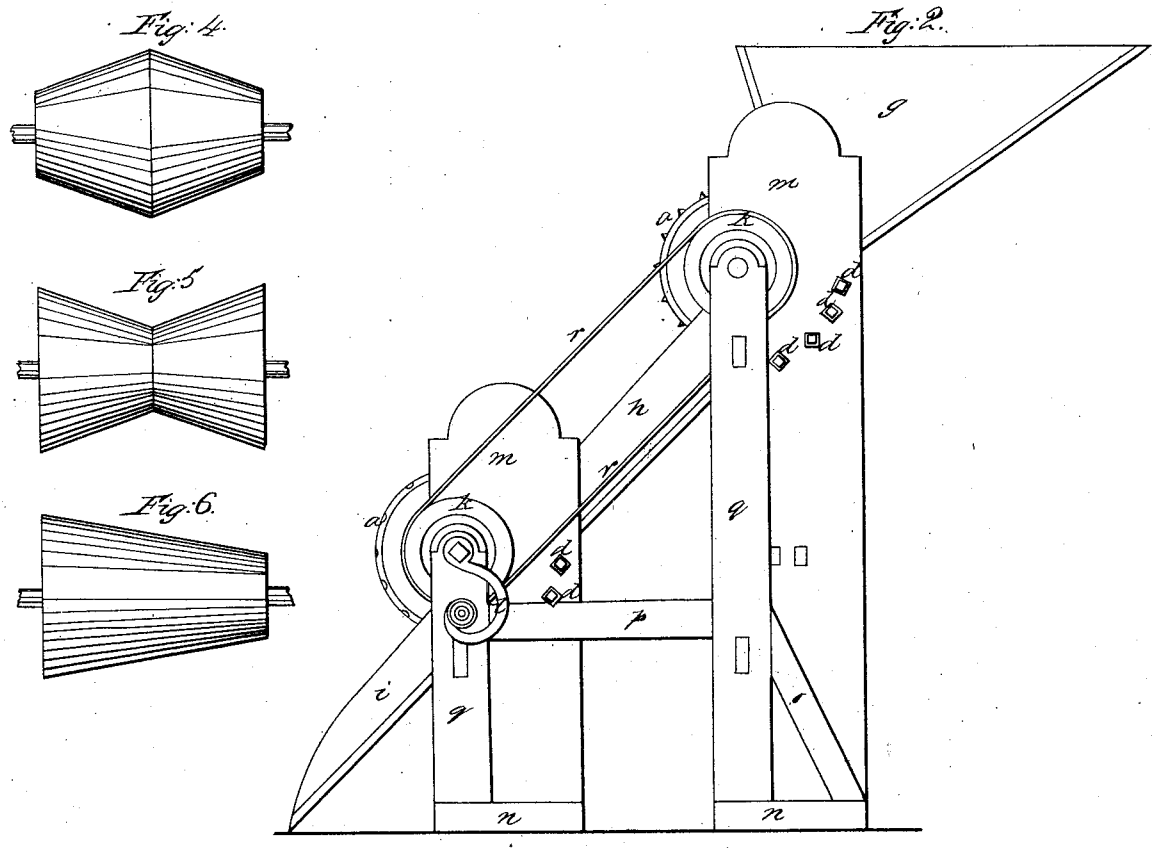
N. PETERS. Photo-Lithographer, Washington, D. C.

MISSING PAGE TEMPORARY NOTICE

PATENT # 3760X FOR ISSUE DATE 9-26-1823

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text